May 10, 1966  H. R. KANSMAN  3,250,144
VIBRATION ABSORBING LINKAGE WITH POSITIVE MOTION TRANSMISSION
Filed Aug. 29, 1963
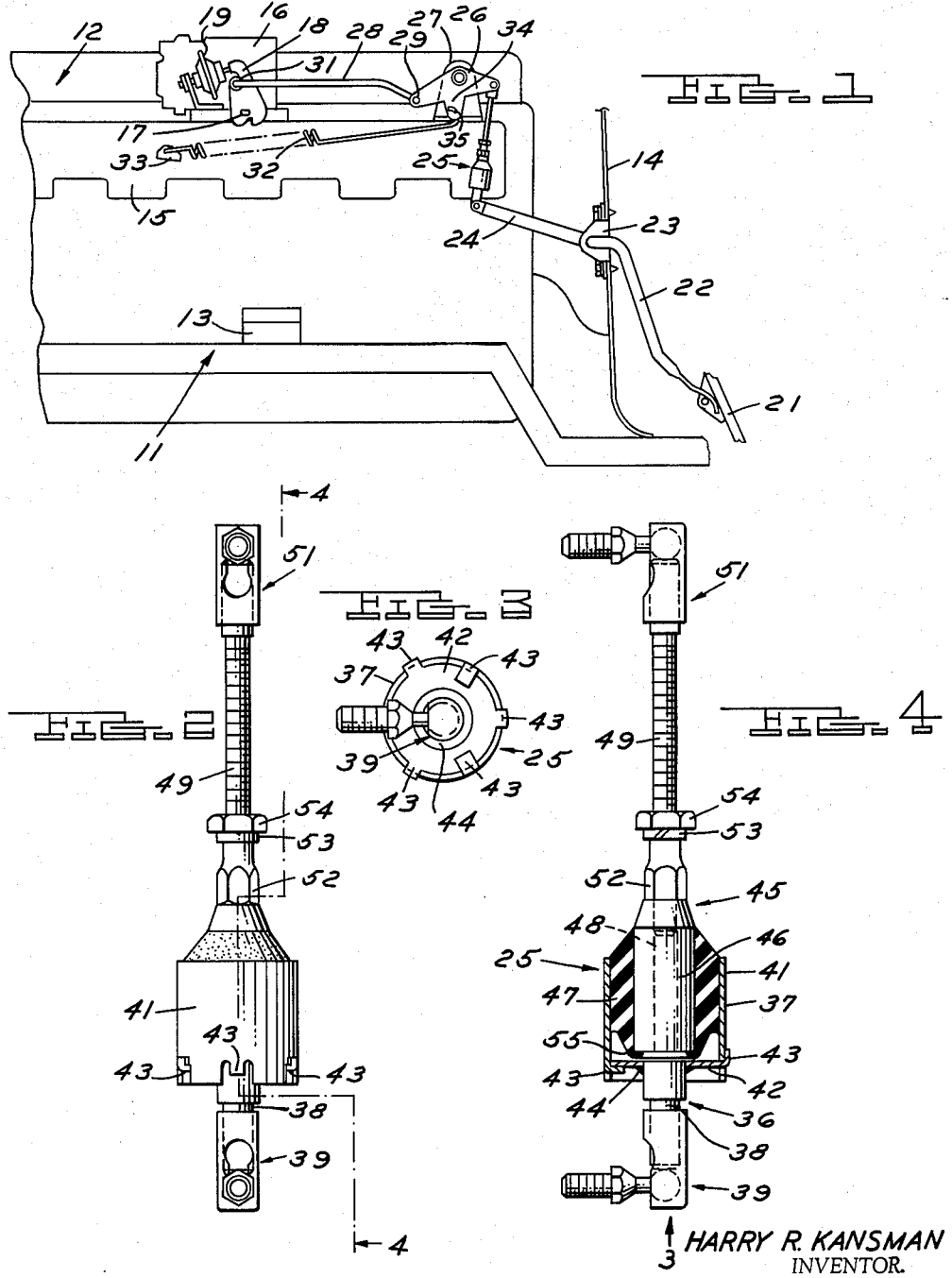
HARRY R. KANSMAN
INVENTOR.
BY John R. Faulkner
Ernest A. Beutler
ATTORNEYS 3,250,144
VIBRATION ABSORBING LINKAGE WITH
POSITIVE MOTION TRANSMISSION
Harry R. Kansman, Farmington, Mich., assignor to Ford
Motor Company, Dearborn, Mich., a corporation of
Delaware
Filed Aug. 29, 1963, Ser. No. 305,438
2 Claims. (Cl. 74—470)

This invention relates to a vibration absorbing motion transmitting linkage and more particularly to a motor vehicle accelerator linkage that isolates engine vibrations from the accelerator pedal.

It is frequently necessary to transmit motion from an actuating member to an actuated member that is supported upon a vibrating component. It is desirable, however, to isolate the vibrations transmitted to the actuated member by its supporting component from the actuating member. The accelerator linkage of a motor vehicle is an excellent example of the need for a vibration damping device in a motion transmitting mechanism.

In the typical motor vehicle, the engine is mounted resiliently upon a chassis so that its vibrations may be absorbed and isolated from the chassis. An accelerator pedal is mounted for movement upon a vehicle body that is generally more rigidly secured to the chassis than is the engine. An accelerator linkage is required to transmit movement from the accelerator pedal to the speed controlling device of the engine even though the pedal and engine have relative movement. Unless some damping mechanism is provided, the engine vibrations will be transmitted by the accelerator linkage back to the accelerator pedal. Undamped accelerator pedal vibration can be very disconcerting to the operator of the vehicle and can cause driver fatigue.

Although it is desirable to provide a vibration eliminating mechanism in the accelerator linkage of a motor vehicle, such mechanisms have not been employed since the known mechanisms sacrifice positive control. As a result, complicated linkages have been employed to isolate engine movements from the accelerator pedal.

It is, therefore, the principal object of this invention to provide a motion transmitting linkage that embodies a simplified vibration damping assembly.

It is a further object of this invention to provide a vibration damping assembly for a motion transmitting linkage that absorbs the vibrations of the actuated member without a significant sacrifice in positive action.

A motion transmitting linkage embodying this invention includes a vibration damping assembly for isolating vibrations generated by the actuated member from the actuating member. The vibration damping assembly includes a first element that is affixed for movement with one of the members and a second element affixed for movement with the other member. The elements are connected for simultaneous movement by an elastomer element that is loaded in shear upon relative movement between the first and second elements. Shear deflection of the elastomer element absorbs vibrations generated by the actuated member.

Further objects and advantages of this invention become more apparent when considered in conjunction with the accompanying drawings, wherein:

FIGURE 1 is a schematic side elevational view of a motor vehicle accelerator linkage incorporating this invention.

FIGURE 2 is a side elevational view of a vibration damping assembly incorporated in the accelerator linkage shown in FIGURE 1.

FIGURE 3 is an end view of the vibration damping assembly shown in FIGURE 2.

FIGURE 4 is a cross sectional view taken substantially along the line 4—4 of FIGURE 2.

Referring now in detail to the drawings, FIGURE 1 illustrates schematically a portion of the motor vehicle including a substantially rigid supporting chassis member 11. An internal combustion engine, indicated generally at 12, is supported upon the chassis member 11 by a plurality of resilient supports 13 (only one of which is shown). A body having a sheet metal fire wall 14 is also supported upon the chassis member 11 in a conventional manner.

The internal combustion engine 12 includes an intake manifold 15 that distributes a combustible mixture to the cylinders of the engine from a carburetor 16. The speed of the engine 12 is controlled by a throttle valve (not shown) supported upon a throttle valve shaft 17 of the carburetor 16. A throttle lever 18, affixed to the throttle valve shaft 17, is adapted to contact a dashpot 19 to retard the rate of closing of the throttle valve.

An accelerator pedal 21 is movably supported within the passenger compartment of the body adjacent the fire wall 14. Movement of the accelerator pedal 21 is transmitted to an accelerator link 22 that has an offset intermediate portion pivotally journaled within a bracket 23 that is affixed on the engine compartment side of the fire wall 14. Movement of the accelerator pedal 21 causes the accelerator link 22 to pivot about its journal in the bracket 23. The accelerator link 22 has a portion 24 that extends forwardly toward the engine from the fire wall 14.

A vibration damping assembly indicated generally by the reference numeral 25 is pivotally connected at its lower end to the forward end of the accelerator lever portion 24. The upper end of the vibration damping assembly 25 is pivotally connected to a bell crank 26 that is, in turn, pivotally supported on a bracket 27, affixed to the intake manifold 15. A carburetor connecting link 28 is pivotally connected, as at 29, to the bell crank 26. The forward end of the carburetor connecting link 28 is pivotally connected, as at 31, to the throttle lever 18.

A tension spring 32 has one of its ends connected to a bracket 33 that is affixed to the intake manifold 15. The other end of the tension spring 32 is connected to a downwardly extending ear 34 of the bell crank 26, as at 35. The tension spring 32 normally urges the bell crank 26 in a clockwise direction. Clockwise rotation of the bell crank 26 causes counterclockwise rotation of the accelerator link 22 about its journal in the bracket 23 to return the accelerator pedal 21 to an idle position. The throttle lever 18 and throttle valve are simultaneously moved in a counterclockwise direction to their idle position by the carburetor connecting link 28.

Depression of the accelerator pedal 21 causes clockwise rotation of the accelerator link 22. The clockwise rotation of the accelerator link 22 exerts an upward force on the vibration damping assembly 25 to cause counterclockwise rotation of the bell crank 26 in opposition to the action of the tension spring 32. The counterclockwise rotation of the bell crank 26 draws the carburetor connecting link 28 toward the fire wall 14 and rotates the throttle lever 18 in a clockwise direction. Clockwise rotation of the throttle lever 18 opens the carburetor throttle valve.

It is well known that a running internal combustion engine vibrates considerably. The resilient support of the engine 12 upon the chassis member 11 isolates the vibrations of the engine from the passengers of the vehicle. The vibrations of the engine 12 are transmitted to the carburetor 16 and throttle lever 18; however the vibrations of the throttle lever 18 are transmitted through the carburetor connecting link 28 to the bell crank 26. The vibrations are isolated from the accelerator pedal 21 by the vibration damping assembly, indicated generally at 25, and shown in greater detail in FIGURES 2–4.

The vibration damping assembly 25 includes a first element 36 that terminates in a cylindrical shaped end portion 37 that is connected to a rod shaped portion 38. A swivel assembly, indicated generally at 39, is provided to pivotally connect the rod shaped portion 38 with the end of the accelerator lever portion 24. The cylindrical shaped end portion 37 is formed of a sheet metal cylindrical member 41 and a sheet metal end flange 42 that are secured together by a plurality of alternately extending tabs 43. The end flange 42 is welded as at 44 to the rod shaped portion 38.

A second element 45 terminating in a rod shaped end portion 46 is axially aligned with the first element 36. The rod shaped end portion 46 is contained in and coaxial with the cylindrical shaped end portion 37. An elastomer bushing 47 has an outer surface bonded to the inner surface of the cylindrical shaped end portion 37. An inner diameter of the elastomer bushing 47 is bonded to the rod shaped end portion 46. The elastomer bushing 47 normally forms the sole connection between the elements 36 and 45.

The element 45 is formed with a central bore 48 that is threaded at the end opposed to the rod shaped end portion 46. A threaded rod 49 is screwed into the threaded portion of the bore 48. The upper end of the threaded rod 49 is connected by a swivel mechanism, indicated generally at 51, to the bell crank 26.

The accelerator linkage may be adjusted by threading the rod 49 into or out of the element 45. The element 45 is provided with a hexagonal exterior surface 52 to facilitate the adjustment. A lock washer 53 and nut 54 are provided to lock the linkage in the adjusted position.

As has been noted, vibrations of the engine 12 upon its resilient supports 13 will be transmitted through the throttle lever 18 and carburetor connecting link 28 to the bell crank 26. Vibratory movement of the bell crank 26 results in reciprocatory movement of the threaded rod 49 and portions of the vibration damping assembly element 45. Generally, the resistance of the accelerator pedal 21 and accelerator lever 22 to movement will resist movement of the element 36. The elastomer bushing 47 has sufficient resilience in shear to permit limited relative movement between the elements 45 and 36 during the vibratory movement. The elastomer bushing 47 thus will dampen the vibrations of the engine and isolate them from the accelerator pedal 21.

Since the elastomer bushing 47 provides substantially the sole connection between the accelerator pedal 21 and the throttle valve, there is possible sacrifice of positive control. Means are provided for limiting the relative movement between the elements 45 and 36 of the vibration damping assembly 25 and the loss of control that occurs during the relative movement.

It will be noted that a clearance exists between the end of the rod shaped end portion 46 and the flange 42 of the cylindrical end portion 37. The amount of relative movement between the elements 36 and 45 is limited by the clearance which exists between the end of the rod shaped end portion 46 and the flange 42 of the cylindrically shaped end portion 37. This clearance is kept sufficiently small to accommodate the relative movement permitted by the vibration induced shear deflection of the elastomer bushing 47. Actuating forces exerted upon the accelerator pedal 21 will cause a greater amount of deflection in the elastomer bushing 47 than the engine vibrations. The deflection would normally be limited by contact of the flange 42 with the rod shaped end portion 46. To preclude the metal-to-metal contact, the elastomer bushing 47 extends over the end of the rod shaped portion 46 as at 55. The flange 42 will contact the portion 55 to preclude metal-to-metal contact and eliminate the noise which might otherwise occur. The portion 55 will be loaded in compression when the clearance between the elements is taken up to offer a significantly increased resistance to relative movement.

It is to be understood that the invention is not limited to the exact construction shown and described, but that various changes and modifications may be made without departing from the spirit and scope of the invention as defined by the appended claims.

What is claimed is:

1. A linkage for transmitting motion from an actuating member to an actuated member supported upon a component that is subjected to vibrations, said linkage including a vibration damping assembly for isolating the vibratory movement of said actuated member from said actuating member, said vibration damping assembly comprising a first substantially rigid element affixed for simultaneous movement with said actuating member, a second substantially rigid element affixed for simultaneous movement with said actuated member, an elastomer element affixed between said first and second elements for transmitting linear motion therebetween, said elastomer element being loaded primarily in shear upon relative linear movement between said first and second elements, said elastomer element further being sufficiently resilient to deflect in shear upon vibratory movement of said actuated member without causing corresponding movement of said actuating member, and means on said first element positioned to abut said elastomer element to limit the shear deflection of the latter in the direction of motion transmittal for causing substantially positive linear actuating forces to be transmitted through said elastomer element from said actuating member to said actuated member.

2. A motion transmitting linkage as defined by claim 1 wherein the means for limiting the shear deflection of the elastomer element loads the elastomer element in compression upon a predetermined shear deflection.

References Cited by the Examiner

UNITED STATES PATENTS

| | | | |
|---|---|---|---|
| 140,677 | 7/1873 | Bushfield | 74—561 |
| 927,201 | 7/1909 | Wilkinson | 74—561 X |
| 1,778,503 | 10/1930 | Lord | 74—470 X |
| 1,859,038 | 5/1932 | Irgens. | |
| 2,090,246 | 8/1937 | Alexander | 74—470 X |
| 2,118,209 | 5/1938 | Linthwaite | 115—18 |
| 2,236,653 | 4/1941 | Starke. | |
| 2,305,795 | 12/1942 | Schieferstein. | |
| 2,977,816 | 4/1961 | Rice | 74—481 X |

BROUGHTON G. DURHAM, *Primary Examiner.*

C. F. GREEN, *Assistant Examiner.*